United States Patent
Wehner

(10) Patent No.: US 8,501,323 B2
(45) Date of Patent: *Aug. 6, 2013

(54) TWO-COMPONENT COMPOSITION FOR PRODUCING POLYURETHANE GEL COATS FOR EPOXY-RESIN AND VINYL-ESTER RESIN COMPOSITE MATERIALS

(75) Inventor: Jochen Wehner, Hamburg (DE)

(73) Assignee: Mankiewicz Gerb. & Co. (GmbH & Co. KG), Hamburg (DE)

( * ) Notice: Subject to any disclaimer, the term of this patent is extended or adjusted under 35 U.S.C. 154(b) by 786 days.

This patent is subject to a terminal disclaimer.

(21) Appl. No.: 10/572,784

(22) PCT Filed: Sep. 16, 2004

(86) PCT No.: PCT/EP2004/010415
§ 371 (c)(1),
(2), (4) Date: Mar. 21, 2006

(87) PCT Pub. No.: WO2005/030825
PCT Pub. Date: Apr. 7, 2005

(65) Prior Publication Data
US 2006/0287463 A1      Dec. 21, 2006

(30) Foreign Application Priority Data

Sep. 23, 2003 (DE) .................. 103 44 380

(51) Int. Cl.
*B32B 27/38* (2006.01)
(52) U.S. Cl.
USPC .............. 428/413; 428/424.4; 428/423.1; 428/423.7
(58) Field of Classification Search
USPC ............. 528/68, 85, 44, 48, 59, 60, 64, 65, 528/66, 75; 428/413, 424.4, 423.1, 423.7; 427/386
See application file for complete search history.

(56) References Cited

U.S. PATENT DOCUMENTS

| 3,217,536 | A | * | 11/1965 | Motsinger et al. | 73/170.15 |
|---|---|---|---|---|---|
| 3,520,747 | A | * | 7/1970 | McGaughey | 156/153 |
| 3,607,600 | A | * | 9/1971 | Schreter et al. | 415/200 |
| 3,646,651 | A | * | 3/1972 | McGaughey et al. | 492/52 |
| 3,765,979 | A | | 10/1973 | Thomas | |
| 4,089,215 | A | | 5/1978 | Chapin | |
| 4,267,299 | A | * | 5/1981 | Oechsle, III | 528/48 |
| 4,571,798 | A | | 2/1986 | Adams | |
| 4,581,433 | A | * | 4/1986 | Potter et al. | 528/64 |
| 4,950,792 | A | * | 8/1990 | Althaus et al. | 564/335 |
| 5,026,815 | A | | 6/1991 | Völker et al. | |
| 5,077,371 | A | | 12/1991 | Singh et al. | |
| 5,340,652 | A | * | 8/1994 | Sondhe et al. | 428/413 |
| 5,362,834 | A | | 11/1994 | Schäpel et al. | |
| 5,387,750 | A | | 2/1995 | Chiang | |
| 5,486,096 | A | | 1/1996 | Hertel et al. | |
| 5,607,998 | A | * | 3/1997 | Markusch et al. | 524/494 |
| 5,656,677 | A | | 8/1997 | Jourquin et al. | |
| 5,739,247 | A | | 4/1998 | Lesko et al. | |
| 5,760,098 | A | * | 6/1998 | Haas et al. | 521/125 |
| 5,895,689 | A | * | 4/1999 | Gajewski | 427/425 |
| 5,962,617 | A | | 10/1999 | Slagel | |
| 6,013,692 | A | | 1/2000 | Daum et al. | |
| 6,046,297 | A | * | 4/2000 | Rosenberg et al. | 528/63 |
| 6,187,892 | B1 | | 2/2001 | Markusch et al. | |
| 6,821,059 | B2 | * | 11/2004 | Markusch et al. | 405/302.7 |
| 2003/0134063 | A1 | | 7/2003 | Vance et al. | |
| 2004/0211130 | A1 | | 10/2004 | Horstman et al. | |

FOREIGN PATENT DOCUMENTS

| DE | 690 11 540 T | 12/1994 |
|---|---|---|
| DE | 197 32 313 A | 2/1998 |
| DE | 198 36 193 | 12/1999 |
| DE | 102 12 391 A1 | 10/2003 |
| EP | 0026915 A2 | 4/1981 |
| EP | 0 511 570 | 11/1992 |
| EP | 1131366 A1 | 9/2001 |
| WO | WO 87/07287 | 12/1987 |
| WO | 0018816 | 4/2000 |

OTHER PUBLICATIONS

"Szycher's Handbook of Polyurethanes", CRC Press, Boca Raton, 1999. (Spec, p. 12).
Bielemann, Johan H., "Lackadditive", Weinheim, Wiley-VCH, 1998. (Spec, p. 13).
Flemming, M., G. Ziegmann and S. Roth, "Faserverbundbauweisen", Springer, Berlin, Heidelberg, New York, 1996. (Spec, p. 14).

* cited by examiner

Primary Examiner — Michael L Leonard
(74) Attorney, Agent, or Firm — Abel Law Group, LLP

(57) ABSTRACT

The invention relates to the use of a two-component composition comprising a polyol component and a polyisocyanate component, for producing polyurethane gel coats for epoxy-resin and vinyl-ester resin composite materials.

22 Claims, No Drawings

TWO-COMPONENT COMPOSITION FOR PRODUCING POLYURETHANE GEL COATS FOR EPOXY-RESIN AND VINYL-ESTER RESIN COMPOSITE MATERIALS

CROSS REFERENCE TO RELATED APPLICATIONS

Applicant claims priority under 35 U.S.C. §119 of German Application No. 103 44 380.0 filed Sep. 23, 2003. Applicant also claims priority under 35 U.S.C. §365 of PCT/EP2004/010415 filed Sep. 16, 2004. The international application under PCT article 21(2) was not published in English.

The invention concerns the use of a two-component composition, which comprises a polyol component and a polyisocyanate component, for the production of polyurethane gel coats for epoxy resin and vinyl ester resin composite materials. The invention in addition concerns a production method for the composite material and the composite material.

The surfaces of composite materials (for example composite materials made of glass fibre fabric or nonwoven and epoxy resin/vinyl ester resin) are often of poor appearance and in addition not resistant to light and weathering. They must therefore be provided with a surface coating. Before the surface coating of epoxy resin/vinyl ester resin composite materials, they must be polished and filled (leveled out), since erection of fibres often occurs during direct surface coating of the composite material. An alternative to this is the use of a gel coat.

A gel coat is a resin system which can be applied onto moulded parts of composite structure for the production of smooth building component surfaces and at the same time also results in an attractive surface. In the in-mould process, the gel coat resin system, after the mixing of its reaction components, is introduced into a mould as a first layer within the processing time (pot life). The layer obtained after gelling is sufficiently mechanically stable not to be damaged during the application of the synthetic resin (for example an epoxy resin) and optionally an inorganic or organic nonwoven or fabric (for example a glass fibre fabric or glass fibre nonwoven). The same applies during injection processes and during the application of wet laminates and during the application of prepregs.

In order to ensure adequate adhesion between (i) epoxy resin and/or vinyl ester resin (synthetic resin) and (ii) gel coat, the coating with synthetic resin must take place within the lamination time of the gel coat. Subsequently, the synthetic resin and gel coat are cured completely.

In the description of the invention, the following definitions of terms apply:

The lamination time is the period beginning with the tack-free time of the gel coat film applied into the mould, in which period the gel coat must be overlaid with laminate in order still to ensure adhesion between gel coat and laminate.

The pot life is the period beginning with the mixing of the two reaction components until the gelling of the reaction mixture. After the end of the pot life, the reaction mixture is no longer processable.

The tack-free time is the period beginning with the application of the homogeneous, mixed reaction mixture onto the mould surface until the applied film becomes tack-free.

Gel time is understood to mean the time measured until the gelling of the reaction mixture, described in section 9.2.1 of E-DIN VDE 0291-2 (VDE 0291 Part 2): 1997-06.

As gel coat resin systems, formulations based on radical-curing resins such as e.g. unsaturated polyesters (UP), vinyl esters (VE) or acrylate-terminated oligomers are for example used. These resin systems are reliable in processing during use in combination with UP synthetic resins (UP composite materials) and display good adhesion to a large number of synthetic resins (composite material adhesion), since owing to the atmospheric oxygen-inhibited curing reactions at the gel coat surface lying within, curing of the interface only takes place after the application of the synthetic resin. However, many commercial UP-based gel coats do not display adequate gloss retention and tend to chalking and crazing. Other disadvantages of UP-based gel coats are the unavoidable emissions of monomers, frequently very severe shrinkage during curing, which leads to tensions in the composite material/gel coat interface, and hence to poor stability of the interface, and the usually poor adhesion towards composite materials based on epoxy resin (EP resin) and vinyl ester resin (VE resin).

For use in combination with EP composite materials, EP gel coats (e.g. from the company SP Systems) can for example be used. Compared to UP gel coats, EP gel coats display very much better adhesion to EP composite materials. EP gel coats also contain no volatile monomers and therefore give less cause for concern as regards industrial hygiene than the mostly styrene-containing UP gel coats. A disadvantage of EP gel coats is however the low tolerance towards inaccuracies in the mixing ratio. This can under some circumstances lead to greatly reduced mechanical strength in the cured gel coat. Further, the strongly exothermic curing reaction means that at industrially meaningful batch sizes only low accelerator concentrations can be used. This leads to long tack-free times and hence to long mould coating times. Mould coating times are a decisive cost factor in the production of components from fibre composite materials.

In order to enable early laminate overlay, EP gel coats of high crosslinking density are often used. However, a high crosslinking density results in a high glass transition temperature $T_g$ for the cured gel coat (e.g. $T_g=70°$ C. for a normal commercial pigmented EP gel coat from SP Systems). The use temperature of components such as for example rotor vanes, which are coated with such gel coats, usually lies far below the glass transition temperature of the gel coat. Under these use conditions, such gel coats tend to undergo brittle fracture under mechanical stress. One possibility for obtaining more flexible EP gel coats is the use of isocyanate-terminated polyurethanes blocked with nonylphenol as a formula component. This results in flexibilised EP gel coats with improved elongation at break. However, such gel coats also display comparatively long tack-free times. Furthermore, nonylphenol is released during the curing of such polyurethane-modified epoxy resin systems. This is increasingly unacceptable owing to the toxicity of nonylphenol.

Essentially therefore, preference should be given to gel coats based on aliphatic poly-urethanes. However, in the formulation of PUR gel coats it must be borne in mind that conventional mixtures of polyol and polyisocyanate only gel when the reaction is very far advanced. Then however, the reactivity and hence adhesive capacity of the PU gel coat towards the synthetic resin used for the composite material is already severely limited (i.e. the tack-free time is comparatively long, and conversely the lamination time comparatively short). The use of such a conventional product would be difficult to implement with regard to process technology and also unreliable as regards gel coat/synthetic resin adhesion.

Normal commercial aliphatic PUR gel coats (from Relius Coatings or Bergolin) as a rule have comparatively low glass transition temperatures (<40° C.). Consequently they are less brittle than EP gel coats. At curing temperatures (>80° C.) lying markedly higher than the maximum achievable $T_g$ of the PUR gel coat, these products often display surface defects in the form of sink marks after removal from the mould. This severely restricts the range of curing temperatures in which such a product can be used. For this reason, the use of PUR gel coats at curing temperatures of >80° C. is only possible to a limited extent and/or necessitates costly subsequent processing for smoothing of the component surface.

Consequently, it was the object of the invention to provide components for a polyurethane-based gel coat resin system for epoxy resin and/or vinyl ester resin composite materials which do not display the said disadvantages. The components for the gel coat resin system should:

provide a comparatively long lamination time with a pot life sufficient for the mixing and introduction into the mould and gel and tack-free times sufficient for film formation, but comparatively short, be easily processable (i.e. require no additional devices for hot application and/or spray application), provide good adhesion between gel coat and synthetic resin (in case of long lamination times), give a gel coat which displays adequate elongation at break and has no tendency to crazing, create a smooth component surface, free from sink marks even with curing temperatures between 80° C. and 130° C., be inexpensive, and release no toxic or environmentally harmful substances during curing.

In principle, polyurethane gel coats with a high crosslinking density would admittedly be especially suitable for this. A high crosslinking density requires the use of a highly functionalised polyol. However, the use of a highly functionalised polyol is associated with a very short lamination time. Hence it was also an objective of the present invention to provide components for a polyurethane gel coat which on the one hand result in a gel coat with a high crosslinking density, but on the other hand also allow a prolongation of the lamination time.

These problems are solved according to the invention through the use of a two-component composition, which comprises A) a polyol component, which contains one or several polyols and one or several aromatic amines and has a hydroxyl group concentration of 0.5 to 10 mol hydroxyl groups per kg of polyol component, and B) a polyisocyanate component which contains one or several aromatic polyisocyanates, for the production of polyurethane gel coats for synthetic resin composite materials, wherein the synthetic resin comprises epoxy resin and/or vinyl ester resin and is not, or not completely, cured at the time when it is brought into contact with the gel coat.

The invention is inter alia based on the finding that aromatic amines can be added to a polyol component for the production of polyurethane gel coats and the mixture produced from the polyol component according to the invention and a polyisocyanate component displays especially good processing properties in the production of polyurethane gel coats and moreover results in a mechanically especially durable gel coat. Cured gel coats according to the invention preferably have a Shore D hardness of more than 65 (determined as per DIN EN ISO 868), and an elongation at break at 23° C. of preferably greater than 5% (determined as per DIN EN ISO 527) and result in excellent adhesion to epoxy and vinyl ester resins in composite materials. As epoxy resins and vinyl ester resins, all normal commercial materials are suitable. A person skilled in the art is capable of selecting a suitable epoxy or vinyl ester resin depending on the use.

The cured composite material has an adhesive strength at the synthetic resin-polyurethane gel coat interface which is greater than the breaking strength of the laminated resin, i.e. in the plunger pull-off test a cohesion fracture occurs in the laminate or laminate resin. Polyurethane gel coats produced according to the invention preferably display an elongation at break at 23° C. (measured as per DIN EN ISO 527) of at least 3%, preferably greater than 4%, in particular greater than 5%. The elongation at break is determined on the free gel coat (not in the composite material).

The synthetic resin comprises epoxy resin and/or vinyl ester resin, i.e. it is a synthetic resin based on epoxy resin and/or vinyl ester resin. In a preferred embodiment, the synthetic resin is epoxy resin and/or vinyl ester resin, and in a particularly preferred embodiment the synthetic resin is epoxy resin.

The synthetic resin used is not, or not completely, cured during the production of the composite material, i.e. at the time when it is brought into contact with the gel coat. Preferably the polyurethane gel coat is not completely cured at the time when it is brought into contact with the synthetic resin (preferably when the synthetic resin is applied). This means that in the gel coat when brought into contact with the synthetic resin (preferably when the synthetic resin is applied), the reaction of isocyanate groups with hydroxyl groups to give urethane groups is preferably not yet entirely complete. In all embodiments, synthetic resins which contain glass fibre fabric and/or glass fibre nonwoven are preferred, wherein the synthetic resin used is especially preferably a prepreg, in particular an epoxy prepreg with glass fibre fabric and/or glass fibre nonwoven. The synthetic resin can however also be applied onto the gel coat as an injection resin in an injection process.

Moreover, the use of the two-component composition in an in-mould process is especially preferred, wherein the polyurethane gel coat is partially, but not yet completely, cured and the synthetic resin is not, or not completely, cured at the time when it is brought into contact with the gel coat. In this application, the synthetic resin is preferably partially, but not yet completely, cured and contains in particular reinforcing material, such as glass fibre fabric and/or glass fibre nonwoven.

In particular, the invention concerns the use of a two-component composition, wherein the polyol component A), which displays a hydroxyl group concentration of 0.5 to 10 mol hydroxyl groups per kg polyol component, contains:

A1) one or several low molecular weight polyols with a molecular weight of 150 to 600 g/mol and a hydroxyl group concentration of 4 to 20 mol hydroxyl groups per kg of low molecular weight polyol, A2) one or several higher molecular weight polyols and A3) one or several aromatic amines.

1. Polyol Component

The hydroxyl group concentration of the polyol component is 0.5 to 10 mol per kg of polyol component. In preferred embodiments, the hydroxyl group concentration of the polyol component is 1 to 7, preferably 2.5 to 5, in particular 2.0 to 4 mol hydroxyl groups per kg of polyol component.

The polyol contained in the polyol component used according to the invention can in principle be any polyol usual for the production of polyurethanes, for example polyester polyol, polyether polyol, acrylate polyol and/or polyol based on dimeric fatty acids. The use of polyether polyols is however preferred in all embodiments of the invention.

Here the use of polyol mixtures of low molecular weight polyol and higher molecular weight polyol is preferred. Higher molecular weight polyol and low molecular weight polyol can however also be used singly, with the proviso that the hydroxyl group concentration of the polyol component is 0.5 to 10 mol per kg of polyol component.

The polyol component preferably used according to the invention is characterized in that it contains at least one polyol with a comparatively low molecular weight and comparatively high hydroxyl group concentration CoH. The low molecular weight polyol (or the optionally two, three, four, etc., low molecular weight polyols) supports (support) the advantageous action of the aromatic amine and has (have) the effect that at the start of the reaction of the polyol component with a polyisocyanate component (after sufficient pot life and acceptable gel time) a very close-meshed network is already formed, which ensures the desired mechanical stability of the gelled gel coat layer. As a result, the action of the aromatic amine contained in the polyol component is intensified.

Low Molecular Weight Polyol

According to the invention, a "low molecular weight polyol" is defined as a polyol with a molecular weight of 150 to 600 g/mol (preferably 200 to 600 g/mol, more preferably 300 to 500 g/mol and in particular 400 to 500 g/mol) and a hydroxyl group concentration of 4 to 20 mol hydroxyl groups per kg of low molecular weight polyol.

Preferably the hydroxyl group concentration COH lies in the range from 4.5 to 15, more preferably 5 to 12 and in particular in the range from 6 to 10 mol hydroxyl groups per kg of low molecular weight polyol.

In principle according to the invention all straight-chain or branched polyols usual for the production of polyurethanes, for example polyester polyol, polyether polyol, such as polyether glycol, acrylate polyol and/or polyol based on dimeric fatty acids and mixtures thereof are suitable as low molecular weight polyols. Examples are the low molecular weight polyols listed below:

an acrylate-based polyol with a functionality of about 2.3 and a hydroxyl group content of 12.5 mol/kg, a polyether polyol with a functionality of 3 and a hydroxyl group content of about 16.5 mol/kg, a reaction product from trimethylolpropane and polycaprolactone with a functionality of about 3 and a hydroxyl group content of about 10 mol/kg.

Preferably, the content of low molecular weight polyol (i.e. the sum of all low molecular weight polyols in the polyol component) lies in the range from 2 to 70 wt. %, more preferably 5 to 60 wt. %, in particular 10 to 50 wt. % such as 20 to 45 wt. %, a content of 35 to 45 wt. % being particularly preferred, based on the total mass of polyol and aromatic amine (or the sum of the components A1, A2 and A3) of the polyol component.

Higher Molecular Weight Polyol

The higher molecular weight polyol contained in the polyol component preferably used according to the invention can in principle be any polyol usual for the production of polyurethanes, for example polyester polyol, polyether polyol, acrylate polyol and/or polyol based on dimeric fatty acids. Here the components A1 and A2 include all polyols contained in the polyol component used according to the invention, i.e. in general, a polyol which is not a low molecular weight polyol according to the definition stated above counts for the purposes of the present description as a higher molecular weight polyol. Preferred higher molecular weight polyols have a molecular weight of more than 600 to 8000, preferably more than 600 to 6000, in particular more than 600 to 4000 g/mol of higher molecular weight polyol.

Suitable higher molecular weight polyols are for example described in DE-T-690 11 540. Preferred higher molecular weight polyols are polyether polyols (polyalkoxylene compounds) which are formed by polyaddition of propylene oxide and/or ethylene oxide to starters of low molecular weight with OH groups and a functionality of 2 to 8.

Further typical higher molecular weight polyols are the polyester polyols based on polyethylene oxide, polypropylene oxide or both, which have a functionality of 2 to 4, where those higher molecular weight polyether polyols are preferred which have a hydroxyl group concentration in the range from 0.5 to 2.5 mol/kg of higher molecular weight polyether polyol, preferably 0.75 to 1.5 mol hydroxyl groups per kg. The higher molecular weight polyol (or the optionally two, three, four, etc., higher molecular weight polyols) of the polyol component intensifies (intensify) the lamination time-prolonging effect of the aromatic amine. This is important in order to achieve good adhesion to the synthetic resin of the composite material.

Especially preferred higher molecular weight polyols are:

a polyether polyol based on polytetrahydrofuran with a functionality of about 2 and a hydroxyl group content of 1 mol/kg, a polyether polyol with a functionality of about 3 and a hydroxyl group content of about 1 mol/kg, a reaction product from neopentyl glycol and polycaprolactone with a functionality of about 3 and a hydroxyl group content of about 1 mol/kg.

Preferably the content of higher molecular weight polyol (i.e. the sum of all higher molecular weight polyols) in the polyol component lies in the range from 75 to 10 wt. %, preferably 65 to 10 wt. %, more preferably 50 to 12 wt. % and in particular 30 to 15 wt. %, based on the total mass of polyol and aromatic amine (or the sum of the components A1, A2 and A3) of the polyol component. In a preferred embodiment, the polyol component is free from aliphatic dicarboxylic acids.

Aromatic Amine with Low Reactivity Towards Isocyanates

Suitable aromatic amines are for example disclosed in U.S. Pat. No. 4,950,792, U.S. Pat. No. 6,013,692, U.S. Pat. No. 5,026,815, U.S. Pat. No. 6,046,297 and U.S. Pat. No. 5,962,617.

Preferred aromatic amines are characterized in that, when dissolved in toluene (20 wt. % amine in toluene) and mixed at 23° C. with an equimolar amount of oligomeric HDI isocyanate (hexamethylene diisocyanate) with an NCO content of about 5.2 mol/kg and a viscosity in the range from 2750 to 4250 mPas, dissolved in toluene (80 wt. % isocyanate in toluene), they give a gel time of more than 30 seconds, preferably more than 3 minutes, more preferably more than 5 minutes, and in particular more than 20 minutes.

Aromatic amines preferably used according to the invention are methylenebisanilines, in particular 4,4'-methylenebis (2,6-dialkylanilines), preferably the non-mutagenic methylene-bisanilines described in U.S. Pat. No. 4,950,792. The 4,4'-methylenebis(3-$R^1$-2-$R^2$-6-R anilines) listed in the following Table 1 are especially suitable.

TABLE 1

| 4,4'-Methylenebis(3-$R^1$-2-$R^2$-6-$R^3$ anilines) | | | |
|---|---|---|---|
| | $R^1$ | $R^2$ | $R^3$ |
| Lonzacure M-DMA | H | $CH_3$ | $CH_3$ |
| Lonzacure M-MEA | H | $C_2H_5$ | $CH_3$ |
| Lonzacure M-DEA | H | $C_2H_5$ | $C_2H_5$ |

TABLE 1-continued

| 4,4'-Methylenebis(3-R$^1$-2-R$^2$-6-R$^3$ anilines) | | | |
|---|---|---|---|
| | R$^1$ | R$^2$ | R$^3$ |
| Lonzacure M-MIPA | H | C$_3$H$_7$ | CH$_3$ |
| Lonzacure M-DIPA | H | C$_3$H$_7$ | C$_3$H$_7$ |
| Lonzacure M-CDEA | Cl | C$_2$H$_5$ | C$_2$H$_5$ |

The aromatic amine particularly preferred according to the invention is 4,4'-methylenebis(3-chloro-2,6-diethylaniline), Lonzacure M-CDEA.

Preferably the content of aromatic amine in the polyol component (i.e. the sum of all aromatic amines in the polyol component) lies in the range from 0.1 to 20 wt. %, preferably 0.3 to 10 wt. %, more preferably 0.5 to 5 wt. % and in particular 1 to 3 wt. %, based on the total mass of polyol and aromatic amine (or the sum of the components A1, A2 and A3) of the polyol component. The polyol component can also contain aliphatic amine, for example one or several amino alcohol(s).

Catalysts accelerate the polymerisation reaction between polyol component and poly-isocyanate component. In principle, all catalysts known for use in polyurethanes can be used in the polyol component, preferably the lead, bismuth and tin catalysts disclosed in DE-T 690 11 540, and in addition also the strongly basic amine catalyst 1,4-diazabicyclo(2,2,2)-octane and zirconium compounds.

A catalyst particularly preferred according to the invention for use in a polyol component is dibutyltin dilaurate (DBTL).

A polyol component used according to the invention can contain up to 1 wt. %, more preferably 0.05 to 0.5 wt. %, in particular about 0.3 wt. % of catalyst, for example 0.3 wt. %, based on the total mass of the polyol component.

Fillers

The polyol component according to the invention preferably contains rather large amounts of one or several fillers, where for the purposes of the present description "pigment substances" are included in the definition of the term "filler". Preferred fillers are talc, dolomite, precipitated CaCO$_3$, BaSO$_4$, quartz flour, silica, titanium dioxide, molecular sieve and (preferably calcined) kaolin. The filler content of a polyol component preferably lies in the range from 10 to 80 wt. %, more preferably 20 to 70 wt. %, in particular 35 to 55 wt. % such as 40 to 50 wt. %, based on the total mass of the polyol component. Here mixtures of fillers are preferred, for example mixtures of two, three or four fillers.

In addition, ground glass fibres can be contained in the polyol component, for example ground glass fibres of a length of less than 500 μm. These glass fibres prevent the propagation of any crack.

2. Polyisocyanate Component

The polyisocyanate component contains one or several aromatic polyisocyanates. In the aromatic polyisocyanates used according to the invention, the isocyanate groups are bound directly to aromatic systems such as phenylene groups. Here the use of monomeric, oligomeric and polymeric polyisocyanates is possible. Suitable aromatic isocyanates are for example described in "Szycher's Handbook of Polyurethanes", CRC Press, Boca Raton, 1999. Aromatic polyisocyanates preferably used according to the invention are toluene-2,4 or 2,6-diisocyanate, 4,4'-methylenediphenyl diisocyanate (MDI), 2,4'-methylenediphenyl diisocyanate, oligomeric methylenediphenyl diisocyanate (PMDI), p-phenylene diisocyanate (PDI) and naphthalene 1,5-diisocyanate (NDI). In addition, aliphatic polyisocyanates can also be contained in the polyisocyanate component, for example the polyisocyanates described in DE-T2-690 11 540.

The silicic acids usable as fillers in the polyisocyanate component are in particular silanised pyrogenic silicic acids. By means of the preferred content of silicic acid (a thixotropic agent) in the polyisocyanate component, it is ensured that as a result of the similar viscosities of the components the components are readily miscible and moreover the mixture of the components on a vertical area up to 1 mm wet layer thickness does not run off. The content preferably lies in the range from 0.1 to 5 wt. %, more preferably 0.5 to 3 wt. %, in particular 1 to 2 wt. %, based on the total mass of the polyisocyanate component.

Catalysts

The catalysts that can be added to the polyol component can also be contained in the poly-isocyanate component, or in the polyisocyanate component instead of in the polyol component, in the stated concentrations, and zirconium compounds are preferred as catalysts in the polyisocyanate component.

3. Additives (See Textbook: "Lackadditive", Johan H Bielemann, Weinheim, Wiley-VCH, 1998).

Furthermore, either the polyol component or the polyisocyanate component, or both components, can additionally contain one or several additives selected from antifoaming agents, dispersants and deaerating agents.

Antifoaming Agents (defoamers) can be present in an amount up to 2.0 wt. %, preferably up to 1.0 wt. %, based on the total mass of the component in which they are used.

Deaerating Agents can be present in an amount up to 2.0 wt. %, preferably up to 1.0 wt. %, based on the total mass of the component in which they are used. Many antifoaming agents simultaneously act as deaerating agents.

Dispersants can be present in an amount up to 2.0 wt. %, preferably up to 1.0 wt. %, based on the total mass of the component to which they are added.

In the mixing of the polyol component, the polyol(s) with additives is (are) typically first placed in a vacuum dissolver. The fillers and pigments are then dispersed in the polyol (polyols) in the vacuum. For the mixing of the polyisocyanate component, the polyisocyanate is usually first taken and mixed with the appropriate additives. Next the filler and the thixotropic agent are dispersed in the vacuum.

The relative quantities of polyol component and polyisocyanate component are selected such that hydroxyl groups and isocyanate groups react in the particular desired molar ratio. The molar ratio of hydroxyl groups to isocyanate groups (OH:NCO) usually lies in the range from 1:3 to 3:1, preferably 1:2 to 2:1, more preferably 1:1.5 to 1.5:1. According to a particularly preferred embodiment, the OH:NCO ratio lies close to a stoichiometric molar ratio of 1:1, i.e. in the range from 1:1.2 to 1.2:1, preferably 1:1.1 to 1.1:1, and particularly preferred is an equimolar reaction, i.e. the relative quantities of polyol component and polyisocyanate component are selected such that the molar ratio of the hydroxyl groups to isocyanate groups is about 1:1.

The gelling of the mixture of the two components takes place either at room temperature or, if accelerated gelling is desired, at elevated temperature. For example, gelling can also be performed at a temperature of 40° C., 60° C. or even 80° C. However with the particularly preferred mixture of the components of the two-component composition according to the invention a temperature increase to accelerate the gelling is not absolutely necessary.

The synthetic resin preferably comprises one or several reinforcing materials, such as for example fabrics, bonded fabrics, nonwovens or preforms made by weaving or sewing, stitching or gluing of fabrics, bonded fabrics or nonwovens. These can consist of glass, carbon, aramide or polyester fibres or of plastic fibres. Glass fibre fabric and/or glass fibre nonwoven and carbon fibre bonded fabric and fabric are preferred as reinforcing materials.

When the formation of a mechanically sufficiently stable gel is complete, epoxy resin and/or vinyl ester resin and if desired glass fibre fabric or glass fibre nonwoven is applied onto the gel coat within the lamination time. By means of polyol components according to the invention and two-component compositions according to the invention, it is achieved that the lamination time available for the lamination lies in the range from about 20 minutes and 72 hours, typically about 48 hours. The lamination process onto gel coats does not differ from the lamination processes which are used without the use of gel coats and are for example described in "Faserverbundbauweisen" by M. Flemming, G. Ziegmann and S. Roth, Springer-Verlag 1996, Berlin, Heidelberg, New York. The curing of the gel coat normally takes place at elevated temperature.

The invention further concerns a process for the production of synthetic resin composite materials with polyurethane gel coats, which comprises (i) the mixing of a two-component composition which comprises
  A) a polyol component, which contains one or several polyols and one or several aromatic amines and has a hydroxyl group concentration of 0.5 to 10 mol hydroxyl groups per kg of polyol component, and
  B) a polyisocyanate component which contains one or several aromatic polyisocyanates, and at least partial (and preferably partial) curing of the mixture and
(ii) the bringing of the mixture into contact with synthetic resin, wherein the synthetic resin comprises epoxy resin and/or vinyl ester resin and is not, or not completely, cured at the time when it is brought into contact with the gel coat.

In addition, the invention concerns a synthetic resin composite material with a polyurethane gel coat which is obtainable by the said process. A particularly preferred composite material is a wind vane, i.e. a rotor vane for wind power plants, or a part thereof.

The two-component composition according to the invention offers the following advantages:
  it is a system consisting of only two components and therefore simple to process.
  the pot life is only 5 to 15 minutes.
  the mixture of polyol component and polyisocyanate component is tack-free within 20 to 70 minutes, even at 0.5 mm layer thickness and room temperature. No heating is necessary for this.
  the lamination time at room temperature is more than 72 hours, hence very good conditions exist for adhesion to synthetic resin laminates.
  up to 1 mm wet layer thickness on a vertical surface, the mixture of the two components is secure against run-off.
  because of the viscosity of the polyisocyanate component preferably adjusted with silicic acid, there is good miscibility of the two components.
  the compounds used in the production of the two components are easily manageable in terms of industrial hygiene and emission-free during processing.
  the two components give a transparent gel coat, and can therefore be pigmented at will. Transparent gel coats have moreover the advantage that lamination defects such as for example bubbles in the resin, non-permeated regions of the reinforcing material, etc., can be recognised directly after removal from the mould. This prevents complaints.
  the mixed components are also usable as a filling compound or as a coating which does not have to be applied in the in-mould process.
  the mixing of the components proceeds spontaneously.
  complete curing of the mixture of the two components can already be attained within 30 minutes to 2 hours at temperatures of 80 to 160° C.

The gel coat produced according to the invention has the following advantageous properties:
  a long lamination time with short gel and tack-free time.
  after removal from the mould, smooth component surfaces are obtained without surface defects, although the glass transition temperature $T_G$ is comparatively low at ca. 50° C.
  sufficient hardness (Shore hardness D>65) at the use temperature.
  no release of nonylphenyl or other toxic or environmentally harmful substances during the curing reaction.
  good resistance to hydrolysis.
  good resistance to chemicals.
  good abrasion resistance.
  good grindability. Subsequent treatment of the gel coat is in principle not necessary. However, if large components are built up from several individual parts, it is necessary to seal the abutting edges with filling compounds. Excess filling material is as a rule ground off. In order to obtain smooth junctions, it is necessary that the gel coat have good grinding properties. The same applies when repair works become necessary on a mechanically damaged surface.
  the gel coat is markedly less expensive than for example aliphatic PUR gel coats and even less expensive than flexibilised EP gel coats.

The invention is illustrated by the following examples.

EXAMPLES

Test methods used are described below:

Test Method 1

Sufficiently Low Reactivity of Preferred Amines

For the determination of the gel time, the aromatic amine, dissolved in toluene (20 wt. % amine in toluene) is mixed at 23° C. with an equimolar quantity of an oligomeric HDI isocyanate with an NCO content of about 21.8% and a viscosity of the solvent-free isocyanate of 2750 to 4250 mPas, dissolved in toluene (80 wt. % isocyanate in toluene, e.g. Desmodur N3300, Bayer AG). For the determination of the gel time, a Sunshine Gel Time Meter from the firm Sunshine Scientific Instruments is used.

Test Method 2

Determination of $T_G$ Values of Gel Coats

The glass transition temperature was determined by DSC measurements as per DIN 51007.

For this, a cured gel coat test piece was heated from −10° C. to 250° C. at a rate of 10 K/min and the glass transition temperature determined from the heat flow through the sample as per the aforesaid standard. The instrument used for this is a TC11K with a DSC 30 measurement cell from the Mettler company.

Test Method 3

Testing of the Adhesion between Gel Coat and Laminate

A laminate strip 3 cm wide and 20 cm long and of ca. 2 mm thickness which is coated with a 0.7 mm thick layer of a gel coat is broken over a 5 mm mandrel in a bending test as per DIN EN ISO 1519. The fracture edge is visually assessed. A distinction is made between:

a) "No adhesion": i.e. detachment of the gel coat from the laminate already before or during the bending test.
b) "Partial adhesion": i.e. delamination in the gel coat-laminate interface (adhesion break) on fracture.
c) "Complete adhesion": i.e. no detachment of the gel coat layer on fracture of the composite component.

Example 1

Use of Test Method 1

The gel time with the use of aromatic amines was determined according to test method 1. The results with amines from the Lonza company are shown in Table 2 below:

TABLE 2

| Aromatic amine | Gel Time |
| --- | --- |
| M-DEA | 357 secs = 5 mins 57 secs |
| M-MIPA | 221 secs = 4 mins 41 secs |
| M-CDEA | 2635 secs = 43 mins 55 secs |
| M-DIPA | 166 secs = 2 mins 46 secs |

Example 2

Production of Polyol Components

Polyol components were formulated, whose constituents can be seen from Table 3 below.

TABLE 3

| Polyol formulation | PA According to invention Parts by weight | PB Not according to invention Parts by weight |
| --- | --- | --- |
| Polyether polyol (OH content ca. 7 mol/kg) | 38 | |
| Polyether polyol (OH content ca. 1 mol/kg) | 20 | 60 |
| 4,4-methylene-bis (3-chloro-2,6- diethylaniline) | 2 | |
| Fillers (e.g. talc and titanium dioxide) | 30 | 30 |
| Molecular sieve | 10 | 10 |
| Catalyst (e.g. DBTL) | 0.2 | 0.2 |
| Additives | 0.5 | 0.5 |

Example 3

Polyisocyanate Components

Polyisocyanate components were formulated using the constituents listed in Table 4 below.

TABLE 4

| Polyisocyanate component | HA [parts by weight] parts by weight |
| --- | --- |
| Oligomeric 4,4'-diphenylmethane diisocyanate (MDI) (NCO content ca. 7.5 mol/kg) | 97.5 |
| Pyrogenic silicic acid | 2 |
| Additives | 0.5 |

Example 4

Production and Testing of Gel Coats

The production of gel coats and tests thereon are summarised in Table 5 below. The gel coats were produced in each case by mixing a polyol component and a polyisocyanate component, temperature-equalised at 20.5 to 24° C., in a ratio such that a stoichiometric ratio of isocyanate groups to hydroxyl groups was obtained. The mixture was stirred for 1 minute. The mixture was applied in a layer thickness of 500 µm onto a steel mould which had been degreased with solvent and treated with a parting agent, e.g. Zywax Watershield. After this, laminate adhesion, surface quality and glass transition temperature were determined.

The elongation at break (as per DIN EN ISO 527) was determined on non-laminated (free) gel coats which had been cured for 7 hours at 50° C.

TABLE 5

Test Results and Differentiation from Previously Available Gel Coats

| Adhesion to laminate (test method 3) | Stoichiometric mixture of PA and HA | Stoichiometric mixture of PB and HA | Normal commercial EP gel coat I | Normal commercial EP gel coat II |
| --- | --- | --- | --- | --- |
| After a lamination time of 1 hour | complete | partial | complete | complete |
| After a lamination time of 72 hours | complete | none | complete | not determined |
| Surface quality: (visual) | no sink marks smooth surface | very many sink marks | no sink marks smooth surface | no sink marks smooth surface |
| Tack-free time at 20° C. | 35 minutes | ca. 1 hour | 2.5 hours | ca. 1.5 hours |
| Elongation at break | >6% | >6% | 4.5% | 1.5% |
| Glass transition temperature (test method 2) | 50° C. | not determined | 40° C. | 70° C. |

Result:

On comparison, even after 72 hours lamination time and subsequent 5 hours curing of the composite in the vacuum bag at 80° C., the gel coat formulation according to the invention shows markedly better adhesion properties than the PUR formulation not according to the invention. The surface of the gel coat layer according to the invention displays no faults due to sink marks and hence differs from PUR gel coats not according to the invention. Compared to the normal commercial EP gel coats, the gel coat according to the invention is characterized by a markedly shorter tack-free time. Furthermore, the gel coat formulation according to the invention shows markedly higher elongation at break and crack propagation resistance than the normal commercial EP gel coats. With a $T_g$ of 50° C., the PUR gel coat according to the invention displays markedly higher heat deformation resistance than the flexibilised EP gel coat I with a $T_g$ of 40° C. In spite of this, the PUR gel coat according to the invention with an elongation of 6% at break is markedly more flexible than the gel coat I. As expected, this applies also in comparison to EP gel coat II, which with a higher $T_g$ of 70° C. displays very low elongation at break values.

The invention claimed is:

1. An in-mold process for the production of a synthetic resin composite material with a polyurethane gel coat, wherein the process comprises
   (i) mixing a polyol component (A) and a polyisocyanate component (B) and at least partially curing the resultant mixture to form a gel coat resin system;
   (ii) introducing the gel coat resin system into a mold; and
   (iii) applying a synthetic resin that comprises at least one of an epoxy resin and a vinyl ester resin and further comprises an inorganic or organic nonwoven or fabric reinforcing material onto the gel coat resin system, the synthetic resin being not, or at least not completely cured at the time it is contacted with the gel coat resin system and the gel coat resin system being not completely cured at the time it is contacted with the synthetic resin;
   and wherein
   polyol component (A) is a mixture that comprises (i) one or more polyols and (ii) one or more aromatic amines, and comprises from 0.5 to 10 mol of hydroxyl groups per kg of component (A); and polyisocyanate component (B) comprises one or more aromatic polyisocyanates.

2. The process of claim 1, wherein the gel coat material displays an elongation at break at 23° C., measured according to DIN EN ISO 527, of at least 3%.

3. The process of claim 1, wherein the nonwoven or fabric reinforcing material comprises one or more of a glass fiber fabric, a glass fiber nonwoven, a carbon fiber fabric, and a carbon fiber bonded fabric.

4. The process of claim 1, wherein component (A)(i) comprises one or more polyether polyols.

5. The process of claim 1, wherein component (A)(i) comprises at least one of (A1) one or more low molecular weight polyols having a molecular weight of from 150 to 600 g/mol and from 4 to 20 mol of hydroxyl groups per kg of low molecular weight polyol(s), and (A2) one or more higher molecular weight polyols.

6. The process of claim 1, wherein an aromatic amine of component (A)(ii), as a 20 wt. % solution in toluene, mixed at 23° C. with an equimolar quantity of an oligomeric HDI isocyanate having an NCO content of about 5.2 mol/kg and a viscosity of from 2,750 to 4,250 mPas, as a 80 wt. % solution in toluene, affords a gel time, determined according to E-DIN VDE 0291-2, 1997-06, section 9.2.1., of more than 30 seconds.

7. The process of claim 1, wherein the one or more aromatic amines of component (A)(ii) comprise at least one methylenebisaniline.

8. The process of claim 7, wherein the at least one methylenebisaniline comprises 4,4'-methylenebis-(3-chloro-2,6-diethylaniline).

9. The process of claim 1, wherein component (A) comprises from 0.1 to 20 wt. % of the one or more aromatic amines, based on a total weight of components (A)(i) and (A)(ii).

10. The process of claim 5, wherein component (A) comprises from 2 to 70 wt. % of component (A1), based on a total weight of components (A)(i) and (A)(ii).

11. The process of claim 10, wherein component (A) comprises from 5 to 60 wt. % of component (A1).

12. The process of claim 5, wherein component (A1) comprises from 4.5 to 15 mol of hydroxyl groups of per kg of component (A1).

13. The process of claim 5, wherein component (A1) comprises one or more polyols selected from straight-chain and branched polyester polyols, polyether polyols, acrylate polyols, and polyols based on dimeric fatty acids.

14. The process of claim 5, wherein component (A2) comprises one or more polyols selected from polyester polyols, polyether polyols, acrylate polyols, and polyols based on dimeric fatty acids.

15. The process of claim 5, wherein component (A) comprises from 75 to 10 wt. % of component (A2), based on a total weight of components (A)(i) and (A)(ii).

16. The process of claim 1, wherein polyisocyanate component (B) comprises one or more of a monomeric, oligomeric or polymeric polyisocyanate.

17. A synthetic resin composite material with a polyurethane gel coat, wherein the composite material is obtained by the process of claim 1.

18. The composite material of claim 17, wherein the composite material is in a form of a rotor vane for a wind power plant, or a part thereof.

19. An in-mold process for the production of a synthetic resin composite material with a polyurethane gel coat, wherein the process comprises
   (i) mixing a polyol component (A) and a polyisocyanate component (B) and at least partially curing the resultant mixture to form a gel coat resin system;
   (ii) introducing the gel coat resin system into a mold; and
   (iii) applying a synthetic resin that comprises at least one of an epoxy resin and a vinyl ester resin and further comprises an inorganic or organic nonwoven or fabric reinforcing material onto the gel coat resin system, the synthetic resin being not, or at least not completely cured at the time it is contacted with the gel coat material and the gel coat resin system being not completely cured at the time it is contacted with the synthetic resin
   and wherein
   polyol component (A) is a mixture that comprises (i) one or more polyols and (ii) one or more aromatic amines, and comprises from 0.5 to 10 mol of hydroxyl groups per kg of component (A); and polyisocyanate component (B) comprises one or more aromatic polyisocyanates;
   component (A) comprising from 0.1 to 20 wt. % of the one or more aromatic amines, based on a total weight of components (A)(i) and (A)(ii), and component (A)(i) comprising at least one of (A1) one or more low molecular weight polyols having a molecular weight of from 150 to 600 g/mol and from 4 to 20 mol of hydroxyl groups per kg of low molecular weight polyol(s), and (A2) one or more higher molecular weight polyols.

20. The process of claim 19, wherein component (A) comprises from 2 to 70 wt. % of component (A1), based on a total weight of components (A)(i) and (A)(ii).

21. The process of claim 20, wherein component (A) comprises from 5 to 60 wt. % of component (A1).

22. The process of claim 19, wherein the nonwoven or fabric reinforcing material comprises one of more of a glass fiber fabric, a glass fiber nonwoven, a carbon fiber fabric, and a carbon fiber bonded fabric.

* * * * *